US00RE39193E

(19) United States
(12) Reissued Patent
Glaesener

(10) Patent Number: US RE39,193 E
(45) Date of Reissued Patent: Jul. 18, 2006

(54) INJECTION MOLDING MACHINE HAVING A PLATEN FOR UNIFORM DISTRIBUTION OF CLAMPING FORCES

(75) Inventor: Pierre Glaesener, Bisson (LU)

(73) Assignee: Husky Injection Molding Systems Ltd. (CA)

(21) Appl. No.: 10/696,509

(22) Filed: Oct. 30, 2003

Related U.S. Patent Documents

Reissue of:
(64) Patent No.: 6,439,876
Issued: Aug. 27, 2002
Appl. No.: 09/699,927
Filed: Oct. 30, 2000

(51) Int. Cl.
*B29C 45/64* (2006.01)

(52) U.S. Cl. ..... 425/595; 100/295; 425/451.9; 425/472

(58) Field of Classification Search ..... 425/595, 425/451.9, 470, 472; 100/295
See application file for complete search history.

(56) References Cited

U.S. PATENT DOCUMENTS 4,613,475 A * 9/1986 Hettinga ..... 425/589
5,066,217 A * 11/1991 Fukuzawa et al. ..... 425/589
5,110,283 A * 5/1992 Bluml et al. ..... 425/589
5,123,834 A * 6/1992 Joyner ..... 425/592
5,188,850 A * 2/1993 Hirata et al. ..... 425/589
5,249,951 A * 10/1993 Leonhartsberger et al. . 425/589
5,593,711 A * 1/1997 Glaesener ..... 425/595
5,776,402 A * 7/1998 Glaesener ..... 425/589

FOREIGN PATENT DOCUMENTS

EP 0 192 814 * 4/1991

OTHER PUBLICATIONS

Patent Abstracts of Japan, vol. 1997, No. 02, with respect to JP 08 267463 A of Oct. 15, 1996.*

* cited by examiner

*Primary Examiner*—Tim Heitbrink
(74) *Attorney, Agent, or Firm*—Katten Muchin Rosenman LLP

(57) ABSTRACT

An injection molding machine includes a movable platen specifically adapted to uniformly distribute a clamp force to the mold half surfaces thereby reducing localized deflections and unwanted flash on the molded article.

13 Claims, 5 Drawing Sheets

INJECTION MOLDING MACHINE HAVING A PLATEN FOR UNIFORM DISTRIBUTION OF CLAMPING FORCES

Matter enclosed in heavy brackets [ ] appears in the original patent but forms no part of this reissue specification; matter printed in italics indicates the additions made by reissue.

*This application is a reissue of application Ser. No. 09/699,927 filed Oct. 30, 2000, now U.S. Pat. No. 6,439,876.*

BACKGROUND OF THE INVENTION

1. Field of the Invention

This invention relates to a structure for a movable platen for supporting a portion of an injection mold in an injection molding machine. More particularly, the present invention relates to a movable mold supporting platen that has improved rigidity that is slidably carried on an injection molding machine base.

2. Summary of the Prior Art

In general, machines for injection molding of plastics articles include a pair of fixed platens that are spaced from each other and that are interconnected by generally four parallel tie bars that have their axes positioned to define a rectangular array. One of the fixed platens remains stationary and is adapted to support one portion of a two or multiple piece injection mold that when assembled or engaged defines a mold cavity to correspond with the outline of a desired molded part. A movable platen is slidably carried on the tie bars between the fixed platens and is adapted to carry a cooperating portion of the mold so that when the movable platen is moved toward the mold-portion-carrying fixed platen the two mold portions come into contact to define therebetween a mold cavity for forming the desired part.

The movable platen is generally a plate-like structure that is of rectangular configuration and includes four bores at the respective corners, through each of which a tie bar extends. A movable platen actuation system is positioned between the non-mold-carrying fixed platen and the movable platen to cause the movable platen to move along the tie bars toward or away from the mold platen, and also to hold the movable platen firmly in position when the mold portions are together, to prevent separation of the molds as molten material is injected into the mold cavity under high pressure.

Injection molding machine platens are typically block shaped as shown in U.S. Pat. No. 5,188,850 to Hirata et al.; U.S. Pat. No. 5,066,217 to Fukuzawa et al.; U.S. Pat. No. 5,110,283 to Bluml et al.; U.S. Pat. No. 5,123,834 to Joyner; U.S. Pat. No. 5,162,782 to Yoshioka; U.S. Pat. No. 5,192,557 to Hirata et al; U.S. Pat. No. 5,593,711 to Glaesener; and U.S. Pat. No. 5,776,402 to Glaesener. In each of these patents, the mold platen is substantially block shaped having a substantially rectangular side which supports a mold half. During clamp-up of mold halves, a force is generated against the mold mounting face of the platen. As is typical with such block shaped platens, the mold mounting face is caused to concavely deform, forcing the top and bottom edges of the side towards the oncoming force and causing the platen to bend and provide tension across the backside of the mold platen. As a result, under the clamp-up force the center of the platens separate causing a gap between the mold halves, and in some cases, the formation of flash is a by-product.

U.S. Pat. No. 4,615,857 to Baird discloses an encapsulation means and method for reducing flash during mold operations. In accordance with this device, it is alleged that injection and transfer molding of plastic is performed in a manner that virtually eliminates flash. Deflection of the mold press therein is measured with the mold press in the clamping configuration. The support structure of the mold is arranged to apply an equal force to the mold face by configuring supporting pillars and bars such that they act as individual springs against the mold face and in response to the force generated while the mold is in the clamping configuration. The spring constants and the lengths of the supporting pillars and bars are calculated to account for the actual deflection found in the mold press and thereby producing a uniform pressure on the molds during clamping of the press.

Accordingly, the flexure of the mold platens during mold sealing is measured and the compressibility of the mold mounting blocks of the device are adjusted as a function of lateral position on one or both platens in order to compensate for platen flexure, so that a constant force is applied to the parting surface of the mold, independent of lateral position on the parting surface. The stiffness and length of the mounting blocks define the force provided by the mounting blocks and are determined in accordance with predetermined formulas depending upon the position of the block on the platen and the predetermined platen deflection. While Baird compensates for deflection, the method and apparatus by which this is achieved is quite complex requiring individual designs for particular forces to be generated with particular molds. Accordingly, a uniformly applicable design is not achieved.

FIGS. 5a and 5b disclose a prior art molding platen having a shape slightly different than the block shape platens discussed above in the cited patents. As shown in FIG. 5a, the mold platen has a profile including several openings therethrough, a front wall and a back wall. As shown in FIG. 5b, a plurality of slots and ribs extend toward the back wall which can and has a smaller surface area than the front wall of the platen. The platen also includes bores at each corner thereof for receiving tie-bars that resist the force FC between the platens during mold clamp-up. Each tie bar carries a resistance force FR as shown. The plurality of ribs and slots are provided for decreasing the weight of the platen. That is, the front mold mounting face is under compression during mold clamp-up while the back wall is under tension as in a simple beam. The tie bars are drawn inwardly and deform to conform with platen face movement, as shown by the dotted line and arrows in FIG. 5a, thereby causing the mold face to bend and have a concave configuration during molding, similar to the platens of the aforementioned patents. Accordingly, despite the design of the mold platen of FIGS. 5a and 5b, mold face bending is not compensated for and the possibility of the creation of flash still exists. Since both sides of the platen bend, the supports at the corners of the tie bars also bend resulting in uneven loading of the tie bar supports. This causes bending of the tie bars and high stress concentrations leading to premature fatigue failure. Arrows C show how the tie bars are bent during clamp-up.

There exists, therefore, a need for an injection molding machine having a simply designed and lightweight platen which includes means for eliminating or reducing platen deflection during mold or press clamp-up and which substantially eliminates the creation of flash, during injection molding.

SUMMARY OF THE INVENTION

The primary objective of the invention is to provide an injection molding machine having a mold platen designed such that substantially flat and parallel mold mounting faces result during clamp-up.

A further object of the invention is to provide a light weight mold carrying platen that provides substantially flat and parallel mold mounting faces during clamp-up and thus requires lower clamping pressure for a giving injection molding process.

Still yet another object of the present invention is to provide an injection molding machine having a structurally optimized and light weight platen that allows for quicker mold cycle operations, thereby increasing the throughput of a given injection molding machine.

Yet another object of the present invention is to provide an injection molding machine having a platen which uses less energy per operation cycle of the injection molding machine due to the reduced weight of the movable platen.

The foregoing objects are achieved by the injection molding machine of the present invention. The machine includes a stationary platen having a first mold half, at least one movable platen having a second mold half for forming a mold with said first mold half, means for guiding said movable platen relative said stationary platen, and means for injecting molten resin into said mold. For one of the platens a back face is positioned central to the platen for the connection to a pressure source such as a hydraulic cylinder. Parallel to and spaced from the back face is a front face for carrying a mold half, and protruding rearward from the periphery of the front face is a structural wall. Extending from the back face to the front face is a plurality of spaced ribs which are rigidly affixed to the structural wall in a structurally optimized pattern. Means for uniformly directing the clamping force from the center of the back face to the front face to reduce localized bending of the mold face is provided.

The details of the present invention are set out in the following description and drawings wherein like reference characters depict like elements.

DETAILED DESCRIPTION OF THE PREFERRED EMBODIMENTS

Figure 1:
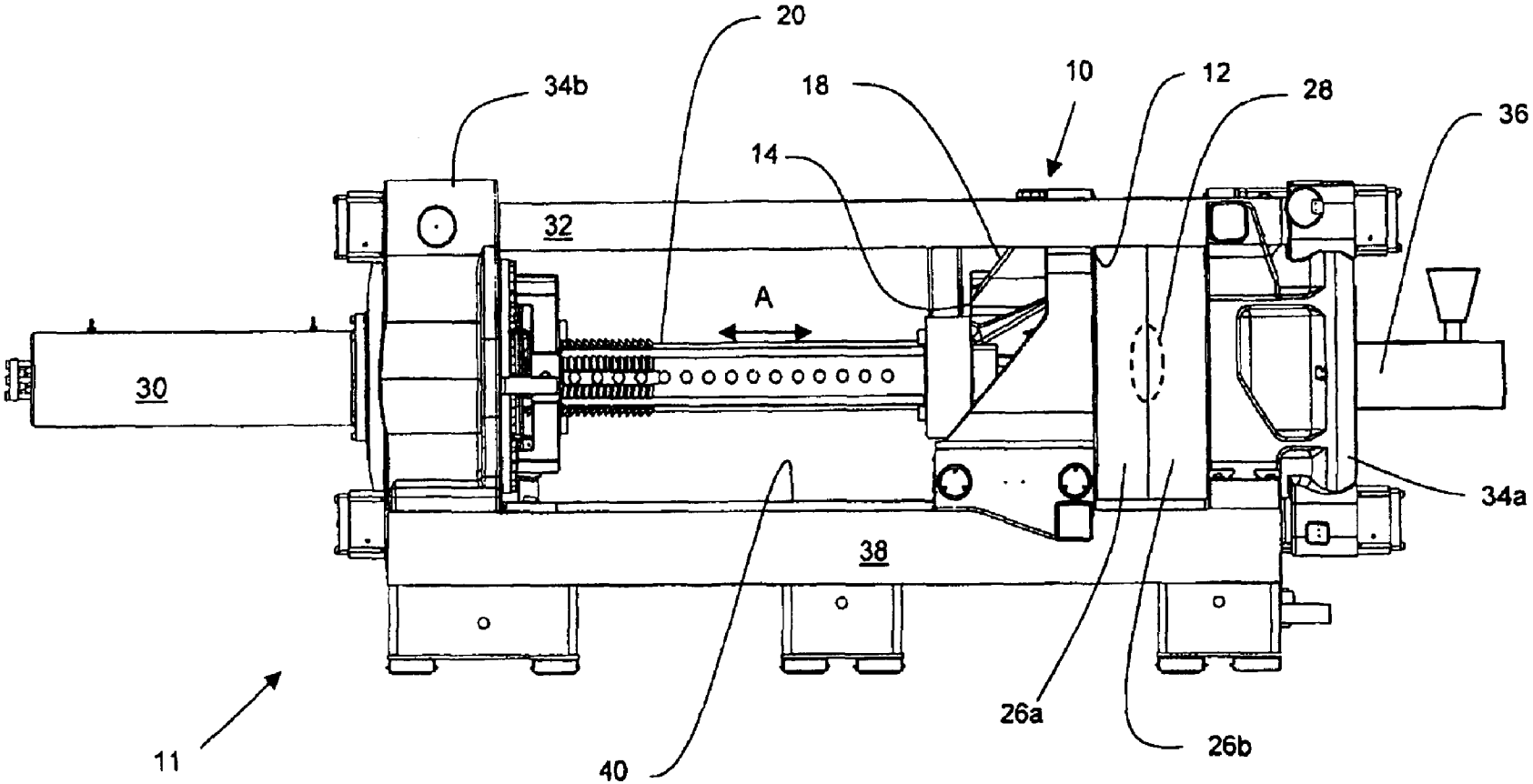
FIG. 1 is a side elevation view of a typical injection molding machine in accordance with the present invention.

Referring to FIG. 1, an injection molding machine 11 is generally shown which uses at least one movable platen 10 in accordance with the present invention. Rigidly affixed to a central location of a back face 14 of the movable platen 10 is at least one clamp column 20 which allows the platen to be opened and closed (arrow A) by a hydraulic cylinder 30. The movable platen 10 rides along a rail 40 affixed to a machine base 38. A plurality of tie bars 32 run the length of the machine 11 and connect to spaced apart [first and second] stationary [platens] *platen* 34a and *clamp block* 34b respectively.

A first mold half 26a is removably attached to a front face 12 of the movable platen 10. A second mold half 26b is removably mounted to [second stationary platen] *clamp block* 34b such that mold halves 26a and 26b form a mold cavity 28 therein when brought into contact during clamp-up by clamp column 20. Attached to the [first] stationary platen 34a and in communication with mold cavity 28 is an injection unit 36 which selectively provides molten resin to mold cavity 28 under high pressure and temperature for the formation of an injection molded article. As the high pressure resin enters the mold cavity, the pressure acts to separate the two faces of mold halves 26a and 26b. It is this injection pressure that the clamping force generated by clamp column 20 must resist.

A plurality of structural ribs 18 extend from back face 14 to front face 12 and provide the means for uniformly distributing the clamping force across the face of mold halves 26a and 26b.

Referring now to FIGS. 2, 3a, 3b and 4, a more detailed view of platen 10 in accordance with the present invention is shown. A plurality of back faces 14a–14d all separated by a center void 22 interface with singular clamp column 20 for the application of a clamp force Fc. The center void 22 creates four separate but coplanar surfaces for the application of the clamp force. Substantially parallel to and displaced from back faces 14a–14d is front face 12 which is specifically adapted to removably attach a mold half 26a. A top wall 46, bottom wall 48 and webs 42a and 42b extend rearward from the periphery of front face 12.

A plurality of ribs 18 extend from rear faces 14a–14d and attach to the back of front face 12 and top wall 46, bottom wall 48 and webs 42a and 42b. Each rib 18 is similarly shaped, exhibiting a trapezoidal shape extending from the back faces 14a–14d to front face 12, top wall 46, bottom wall 48 and webs 42a and 42b. The location, size and pattern of the ribs 18 in combination with the other structural elements, creates a uniformly supported and rigid front face 12. In the preferred embodiment, the location and size of the plurality of ribs 18 are based on structural analysis which yielded an optimized structural design. The optimized structural design defines a structure that uniformly transmits the force from the center clamp column 20 to the front face 12 and minimizes uneven deflections that may occur during clamp-up. Additionally, the optimized structure has resulted in a lower overall weight for the movable platen 10 and this reduces the energy requirements to open and close the mold and allows for quicker cycle times.

The preferred embodiment of the present invention is made from a cast shape of cast iron. It could however easily be made from a casting, weldment or built from separate structural components of suitable material all tied to together in a suitable fashion.

In the prior art, due to uneven sealing pressures that would be substantially lower at the outside edges of the mold as compared to the point where the clamp column 20 is applied, clamp tonnage was oversized to ensure adequate sealing along the outside edges of the mold. In accordance with the present invention, sealing pressures are substantially uniform across the face of the mold, and therefore do not require the clamp tonnage to be oversized. This results in the use of smaller and more efficient injection machine components and a reduction in the energy required during the molding process.

Provided at the bottom two corners of platen 10 are guide blocks 24a and 24b which interface with rail 40. Rail 40 guides the platen 10 in a back and forth direction when the mold is being opened and closed.

Attached between a pair of ribs 18 at the top and bottom of movable platen 10 are stiffeners 44a and 44b respectively.

In the preferred embodiment, these stiffeners are [t-shaped] *T-shaped* stiffeners adapted to increase the structural rigidity of movable platen 10 and increase the load transmission capabilities of ribs 18. Attached to a pair of ribs 18 located at the inside and outside of movable platen 10 is a pair of vertical members 50a and 50b. In the preferred embodiment, these members are singular webs that tie together ribs 18 in those specific locations to increase the load transmission capabilities of movable platen 10. Location and size of vertical members 50a and 50b are based on structural analysis that yields an optimized design.

Figure 2:
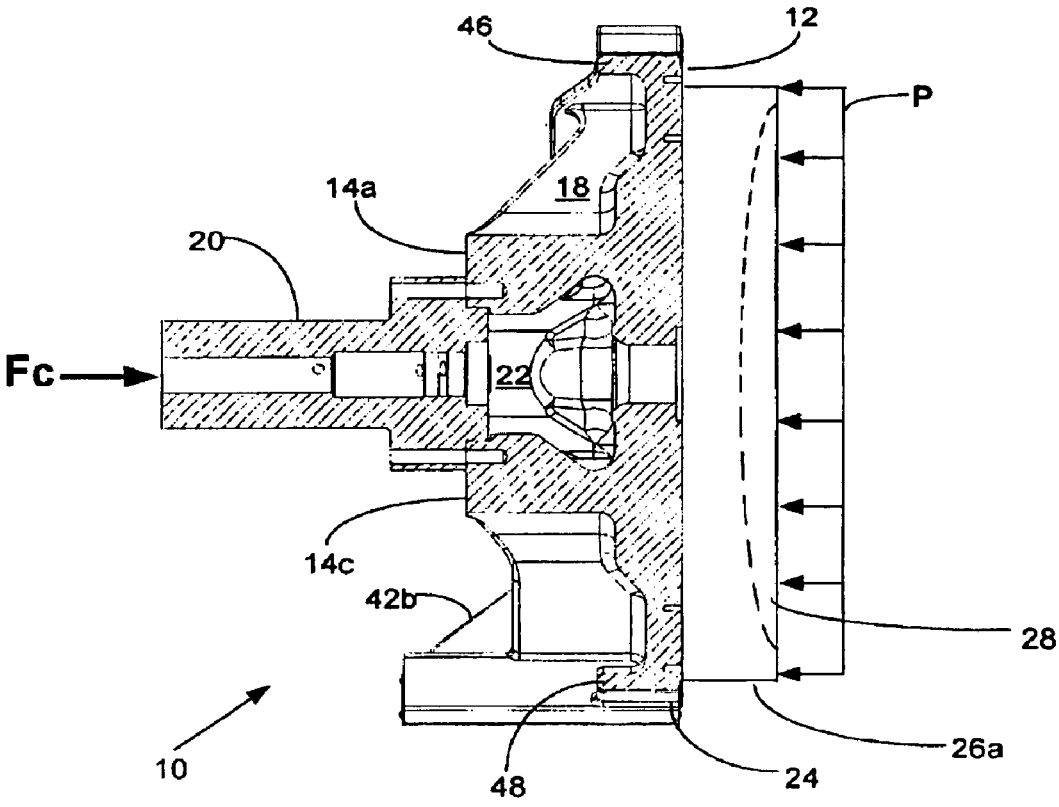
FIG. 2 is a cross-sectional side view of the platen in accordance with the present invention exhibiting a uniform sealing pressure P.
Figure 3A:
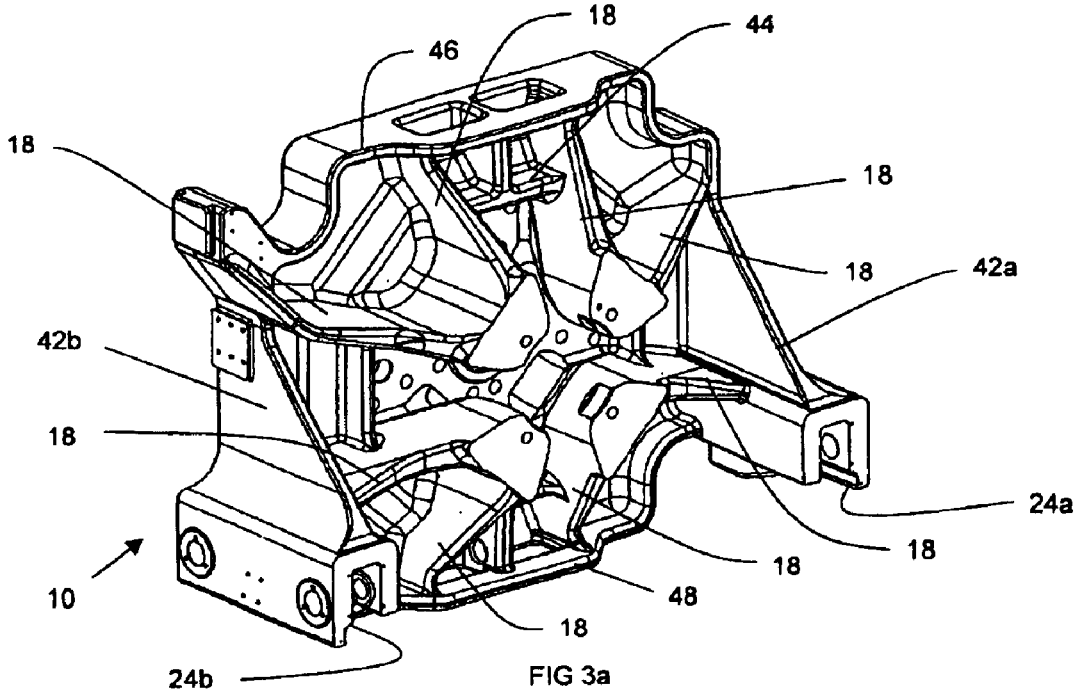
FIG. 3a is an isometric rear view of the improved platen in accordance with the present invention.
Figure 3B:
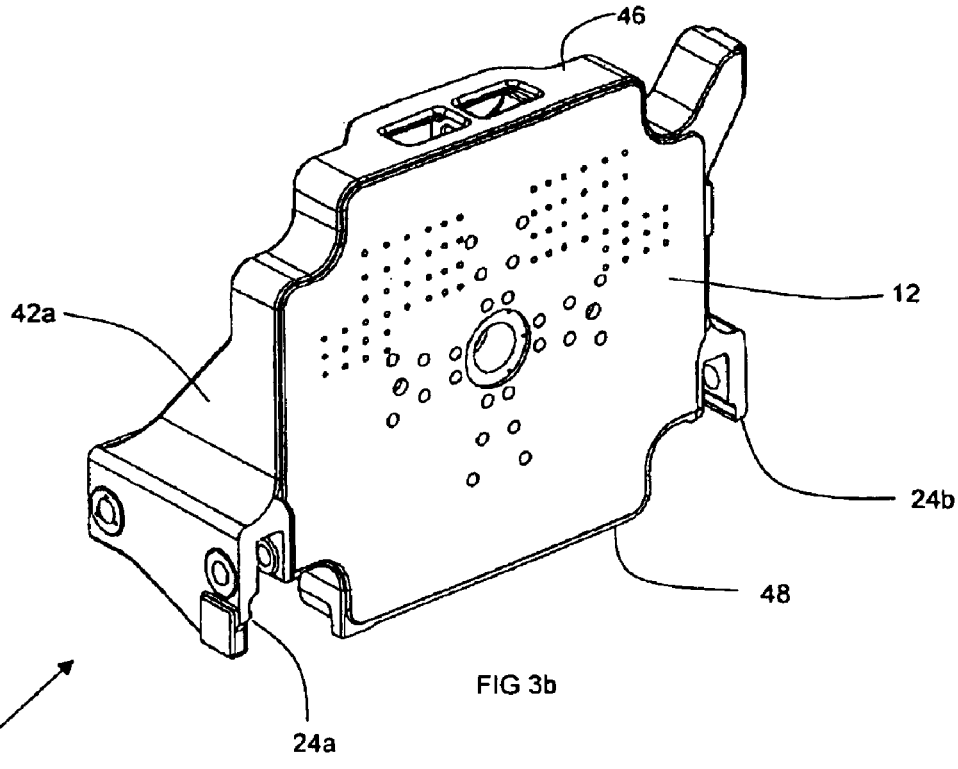
FIG. 3b is an isometric front view of the improved platen in accordance with the present invention.
Figure 4:
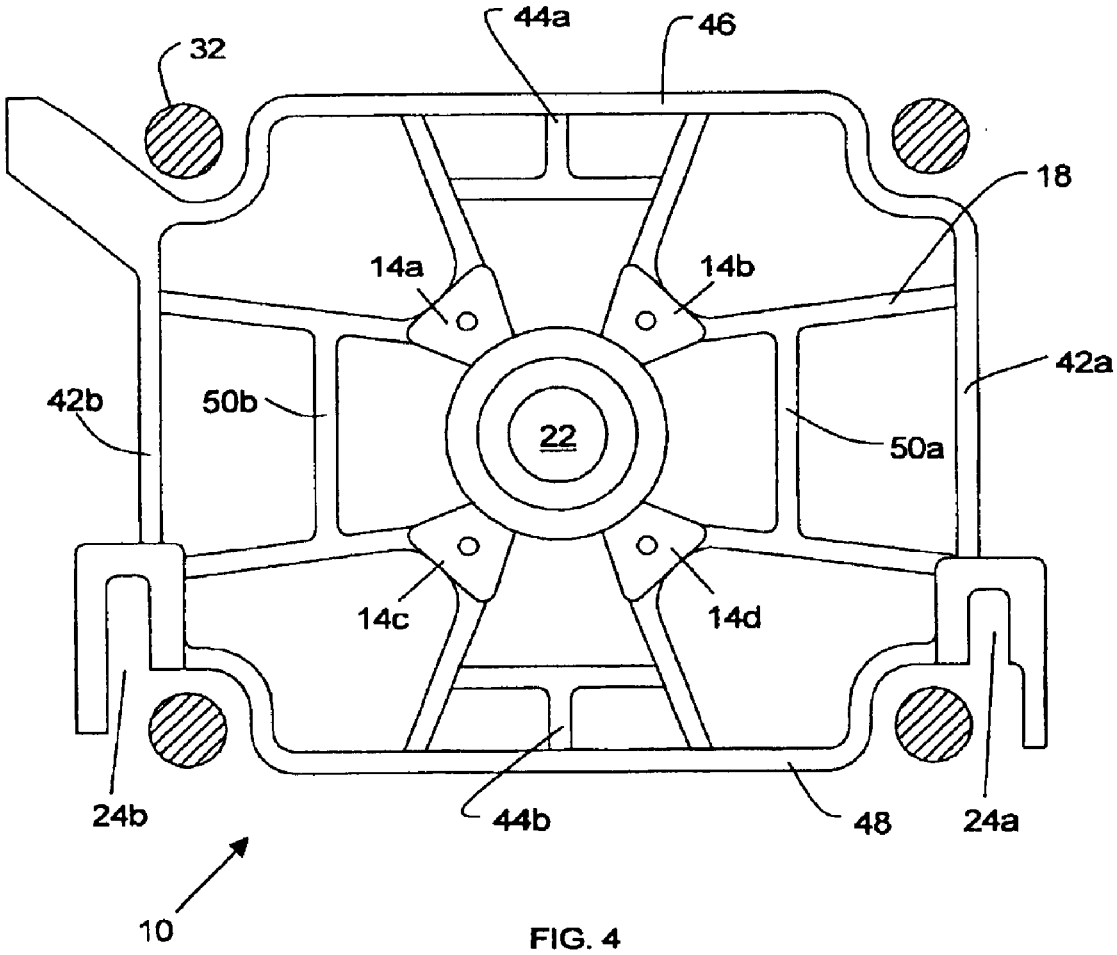
FIG. 4 is a rear elevation view of the improved platen in accordance with the present invention.
Figure 5B:
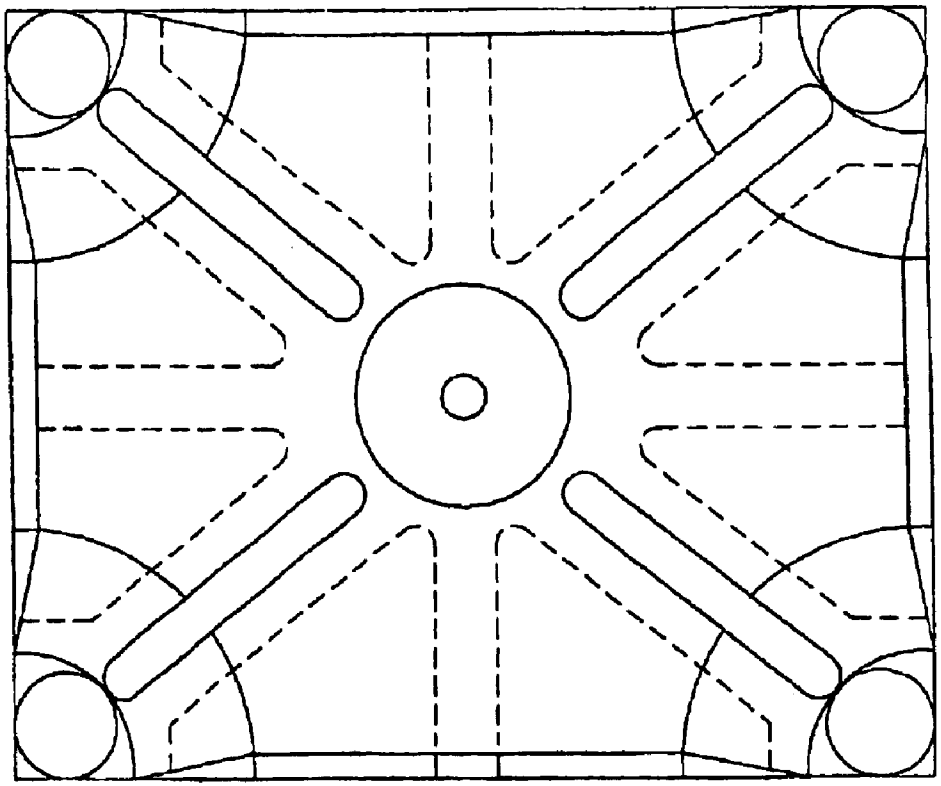
FIG-5b (PRIOR ART)
FIGS. 5a and 5b are elevation views of a platen in accordance with the prior art.
Figure 5A:
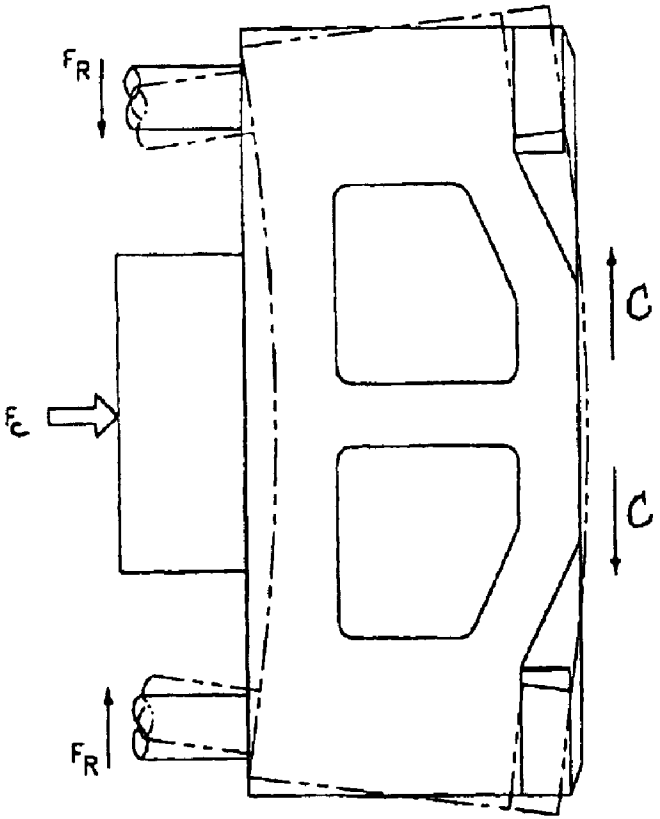
FIG-5a (PRIOR ART)

Referring specifically to FIG. 2, it can be seen that the present invention provides an optimized movable platen 10 structure for the uniform transmission of a clamp force Fc to mold half surfaces. As a result, a uniform pressure distribution P exists at the mold half surface and localized bending and deflections are minimized. The primary advantage to this arrangement is the reduction of clamp force while still avoiding flash on the molded article.

Another advantage of the present invention is that an injection molding machine having a lightweight platen is provided. This allows for the use of less power to move the platen and allows the platen to be moved quicker thereby reducing cycle times.

Still yet another advantage of the present invention is the reduction in energy usage of the molding machine to hold a mold closed during a molding operation due to a uniformly distributed sealing pressure.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A [mold support] platen adapted to be slidably carried on at least one of an injection molding machine, said platen comprising:

a substantially rectangular front face specifically adapted to carry a mold half;

a back face parallel to and spaced from said front face specifically adapted to interface with at least one clamp *column*, said clamp *column* configured to produce a [clamping] *clamp* force substantially in the center of said back face and applying a force substantially perpendicular to said front face;

a wall [having a predetermined thickness and height protruding] *extending* rearward from the periphery of said front face;

a plurality of spaced apart ribs extending in a predetermined pattern between and interconnecting each of said back face, said wall and said front face, wherein said [force from said clamp] *clamp force applied by said clamp column* is substantially uniformly transmitted from said back face to said front face thereby creating a uniform sealing pressure distribution during clamp-up.

2. The [mold support] platen of claim 1, wherein said back face further comprises a center void located in the center of said back face thereby creating four separate coplanar faces for the application of said clamp force.

3. The [mold support] platen of claim 1, further including clearance for the passing of a plurality tie-bars the length of said injection molding machine, said plurality of tie-bars not supporting said platen.

4. The [mold support] platen of claim 1, further comprising a first and second stiffener, each said stiffener attached at a predetermined location between and connecting a pair of said ribs located at the top and bottom of said platen.

5. The [mold support] platen of claim 4, wherein said first and second stiffeners are substantially [t-shaped] *T-shaped* and further attach to said wall.

6. The [mold support] platen of claim 1, further comprising a first and second vertical member, each said vertical member attached at a predetermined position between and connecting a pair of said ribs located at the inside and outside of said platen.

7. The [mold support] platen of claim 1, further comprising at least one guide block in movable communication with said at least one rail.

8. The [mold support] platen of claim 7, further comprising at least one web attached to and connecting said wall to said at least one guide block.

9. The [mold support] platen of claim 1, including a mold adjacent said front face.

10. The [mold support] platen of claim 9, including an injection unit connected to said mold.

11. The [mold support] platen of claim 10, including a means for generating a mold clamping force adjacent said front face.

12. The [mold support] platen of claim 1, wherein said plurality of ribs forms a symmetrical pattern.

13. The [mold support] platen of claim 1, wherein each said plurality of ribs is substantially trapezoidal.

* * * * *